United States Patent

Tolliver et al.

[11] Patent Number: 5,323,641
[45] Date of Patent: Jun. 28, 1994

[54] PIPE JOINT SEAL TESTER

[76] Inventors: Wilbur E. Tolliver, 6371 Kuttshill, NE., Rockford, Mich. 49341; Larry R. Magnuson, 5586 Grand Haven Rd., Muskegon, Mich. 49441

[21] Appl. No.: 890,681

[22] Filed: May 29, 1992

[51] Int. Cl.$^5$ .............................................. G01M 3/28
[52] U.S. Cl. ...................................... 73/46; 73/49.1; 73/49.8; 138/90
[58] Field of Search ................ 73/40, 40.5 R, 40.5 P, 73/46, 49.1, 49.5, 49.8; 138/90, 91

[56] References Cited

U.S. PATENT DOCUMENTS

| | | | |
|---|---|---|---|
| 1,788,845 | 1/1931 | Reynolds | 73/46 |
| 1,931,502 | 10/1933 | Markle et al. | 73/46 |
| 2,927,456 | 3/1960 | Russell | 73/46 |
| 3,000,205 | 9/1961 | Suderow | 73/40.5 P |
| 3,018,657 | 1/1962 | Yevick | 73/46 |
| 3,338,088 | 8/1967 | Smith et al. | 73/49.1 |
| 3,779,068 | 12/1973 | Forsythe | 73/49.1 |
| 3,913,382 | 10/1975 | Kurose et al. | 73/49.8 |
| 4,070,904 | 1/1978 | VanderLans | 73/40.5 R |
| 4,763,511 | 8/1988 | Mathison et al. | 73/49.8 |

FOREIGN PATENT DOCUMENTS

| | | | |
|---|---|---|---|
| 2339083 | 3/1974 | Fed. Rep. of Germany | 73/46 |
| 0108923 | 8/1979 | Japan | 73/46 |
| 1234738 | 5/1986 | U.S.S.R. | 73/46 |

*Primary Examiner*—Hezron E. Williams
*Assistant Examiner*—Michael Brock
*Attorney, Agent, or Firm*—Price, Heneveld, Cooper, DeWitt & Litton

[57] ABSTRACT

A mobile apparatus for testing the integrity of a joint between two sections of concrete pipe in a test-as-you-go method of assembling concrete pipe sections to form a continuous pipe. The apparatus includes a wheel mounted frame which carries a flexible seal used to cover the interior of the entire pipe joint to form a substantially closed annular space. That space and a connected tank provide a substantially known volume for measurement purposes. The pressure in the known volume is monitored over a set period of time to determine the integrity of the pipe joint. The apparatus is moved along the interior of the pipe to test each joint after it is assembled. A method of testing the pipe joints is also disclosed.

20 Claims, 5 Drawing Sheets

PIPE JOINT SEAL TESTER

CROSS-REFERENCE TO RELATED APPLICATIONS

The apparatus of the present invention is preferably intended for use in testing precast concrete pipe as disclosed in United States patent application Ser. No. 07/842,086 filed on Feb. 26, 1992, entitled SHEAR BOLT CONNECTED PRECAST CONCRETE UNITS. The pipe disclosed in that application is preferably lifted and aligned using the apparatus disclosed and claimed in United States patent application entitled PIPE LIFTING APPARATUS which was mailed to the United States Patent and Trademark Office by Express Mail on Apr. 21, 1992, and which has received unofficial Ser. No. 07/871,484. The inventors of both of the above applications are Wilbur E. Tolliver and Larry R. Magnuson, the same inventors as the present application. The contents of both of the above-identified applications are incorporated herein in their entirety.

BACKGROUND OF THE INVENTION

At the present time, the American Society for Testing Materials (ASTM) has three standard tests for concrete pipe sewer lines. According to ASTM test C969-82 (Reapproved 1987) a length of sewer pipe no greater than 700 feet can be tested by either infiltration or exfiltration methods. In both of these tests, care must be taken to properly plug and seal the ends of the sewer pipe and all connections to the sewer pipe. For the infiltration test, if ground water conditions permit, the amount of water leaking into the sewer line is measured, and the rate of infiltration is determined. If the rate is less than or equal to the allowable limit, the section of sewer pipe tested is acceptable.

For the exfiltration test, the sewer line is filled with water to the recommended test head and the rate of water loss is determined. If the rate is less than or equal to the allowable limit, the section of sewer pipe tested is acceptable.

In both the infiltration and exfiltration tests, the ground water conditions around the pipe have a material affect on the test. Also, in exfiltration tests, an extended period of time is required for the pipe itself to stop absorbing water before the test can be carried out. In each of these tests, if a section of pipe fails, a difficult problem is presented in how to repair either the material making up the pipe or the joint in the pipe that is leaking.

The American Society for Testing Materials also has a low pressure air test method to demonstrate the integrity of the installed material and the construction procedures. This practice is used for testing 4 to 24 inch circular concrete pipe sewer lines utilizing gasketed joints. The ASTM designation for this test is C924-89. Great care must be taken with this test to properly prepare the pipe. The ends of the pipe have to be plugged and sealed to prevent any leakage. The seals must also be able to withstand the pressure so as not to be blown out. Even though only three to five pounds of air pressure is used in the test, this can be a dangerous procedure. Also, a large enough air compressor is required for the test to supply the volume of air needed. In the test, the sealed pipe is pressurized and the length of time it takes for the pressure to drop a predetermined amount is used to determine the integrity of the pipe.

The ASTM also has a standard test designation C1103-89 for the joints in installed precast pipe sewer lines. This test is usually used with large precast concrete pipe. The pipe must be large enough for the equipment used to carry out the test and for workers to set up the equipment. In the test, a ring is assembled and positioned internally about the joint in the pipe. A pair of inflatable sealing members near each edge of the ring are inflated, forming an annular space inside the ring. The space can then be filled with air or water and, if the rate of loss of the air or water through the joint is equal to or less than a predetermined amount, the joint is acceptable. If the joint leakage is greater than the predetermined amount, steps must then be taken to repair the joint. This test is typically a "go/no go" test.

None of the previous tests provide a convenient means for testing each pipe joint in a large precast sewer pipe after it has been assembled in a "test-as-you-go" method. Even in the test employing the ring with the inflatable seals, a substantial amount of time is lost in assembling, testing, disassembling and then moving on to the next joint.

SUMMARY OF THE INVENTION

In accordance with the present invention, a mobile testing apparatus is provided which can be moved from joint to joint inside the concrete sewer pipe being assembled to test the pipe in a test-as-you-go method. The mobile pipe joint testing apparatus includes a movable frame for supporting a sealing apparatus for enclosing the interior portion of a pipe joint. The sealing apparatus includes a plurality of substantially rigid members which determine the outer configuration of the seal. A plurality of elongated flexible members are connected at each end to the rigid members to form, along with the rigid members, a substantially continuous surface in the configuration of the interior of the pipe joint being tested. An air pressure determining apparatus is then connected to the sealing apparatus for establishing a controlled air pressure between the seal and the pipe joint being tested. Measuring equipment is used for monitoring the air pressure to determine the integrity of the pipe joint. It is preferred that a ballast tank of predetermined volume be connected to the annular space bounded by the sealing apparatus and the joint being tested so that a substantially known volume is tested at each joint.

After the air pressure is established in the annular space between the seal and the pipe joint, the rate of decrease of the air pressure is monitored to determine the integrity of the joint being tested. If a vacuum or reduced pressure is established in the annular test space, the rate of loss of the vacuum is monitored to determine the status of the joint.

While not preferred, it is within the scope of the present invention to fill the annular test space with water, under pressure, and then monitor the decrease in pressure. After the test, the water remaining in the test space can be recycled or dumped.

The above tests are preferably correlated with the ASTM standard tests so that the results are meaningful to the engineers. Once the test has been completed, the sealing apparatus is released, without disassembly, and is moved along with the mobile supporting frame to the next joint to be tested.

DETAILED DESCRIPTION OF THE PREFERRED EMBODIMENTS

Figures 1, 2:
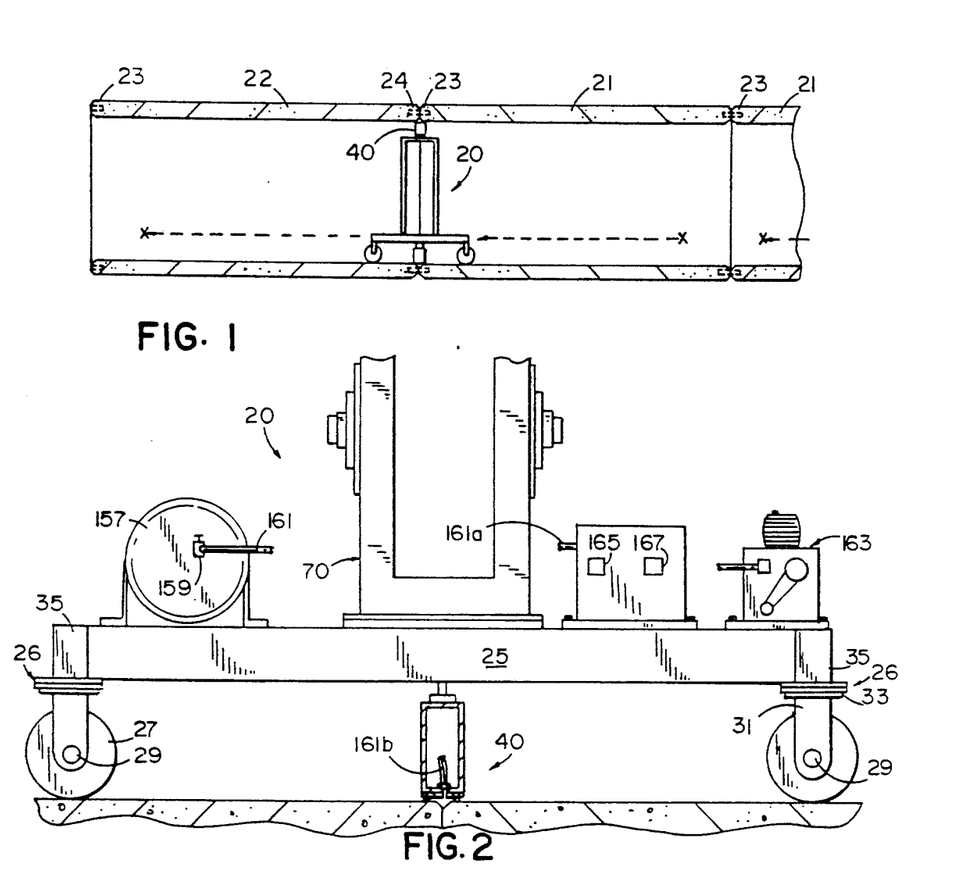
FIG. 1 is a diagrammatic representation of the mobile pipe joint testing apparatus moving through a precast concrete sewer line.
FIG. 2 is an enlarged, fragmentary, elevational view of the mobile pipe joint testing apparatus.

Referring to FIG. 1, the mobile testing apparatus 20 is shown within a pipe made or precast concrete sections. Concrete pipe section 22 has just recently been laid. Pipe section 22 has been connected to pipe section 21 using aligning and joining hardware 23. The joint 24 between pipe sections 21 and 22 is being tested. The mobile testing apparatus is moved along through the interior of the pipe where it tests each pipe joint shortly after it is assembled and while the pipe laying equipment is available to disassemble the pipe in the event a pipe joint fails the integrity test.

Turning now to FIGS. 1 and 2, the testing apparatus includes a frame 25 which is supported on spaced assemblies 26 having wheels 27 supported on axles 29 which extend between a pair of spaced flanges 31 which are, in turn, attached to a load bearing plate 33. An axle (not shown) extends vertically from load bearing plate 33 into a sleeve 35 at each corner of frame 25. The caster or swivel assemblies 26 facilitate the movement of the testing apparatus through the pipe.

A continuous flexible seal 40 surrounds the testing apparatus to provide contact with the portions of the concrete pipe sections on each side of a rubber sealing gasket. The continuous flexible seal encloses an annular space between the seal and the pipe joint.

Figure 3:
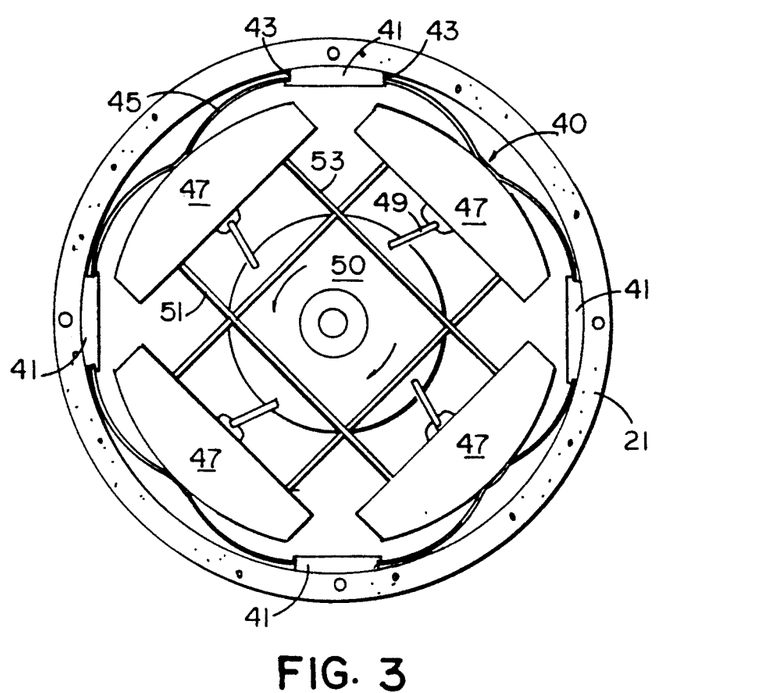
FIG. 3 is a schematic representation of the sealing apparatus used with round precast concrete pipe.
Figure 4:
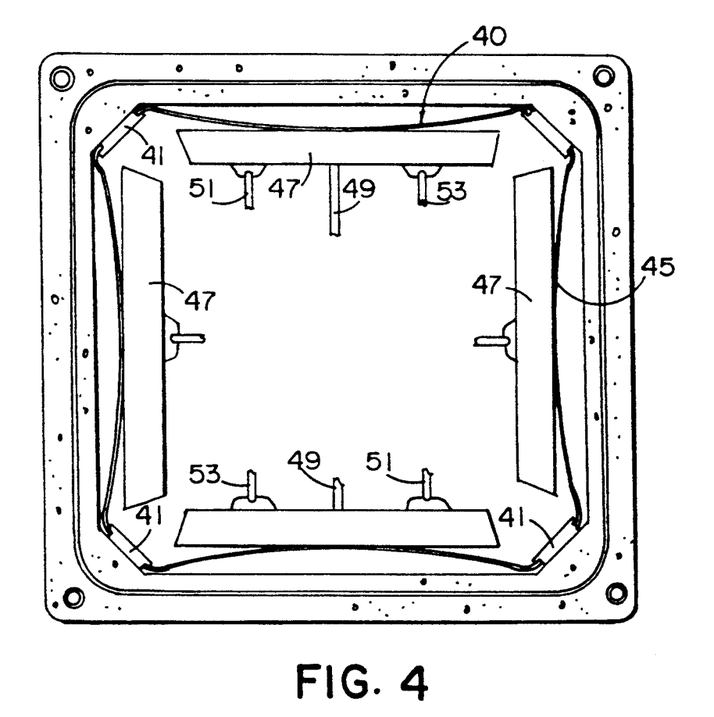
FIG. 4 is a schematic representation of the sealing apparatus used with rectangular precast concrete pipe.

Turning now to FIGS. 3 and 4, it can be seen that the flexible seal 40 is configured to correspond to the shape of the joints in the pipe to be tested. The seal is not dismantled in moving from joint to joint like the previously described testing ring, but rather is flexed inwardly away from the wall of the pipe so that it can be moved. The sealing member 40 is preferably made of steel and has spaced, substantially rigid members 41 which define the overall configuration of the seal. Rigid members 41 are approximately two inches thick and have recessed edge portions 43 for receiving the ends of flexible steel sheet members 45. The sheet steel is approximately five inches wide and one-quarter inch thick. The length of the sheet is determined by the size of the pipe. Referring to FIG. 4, sheet steel members 45 should be long enough to reach between each of rigid members 41. Each end of member 45 is preferably attached to rigid member 41 by welding. Other fastening means such as nuts and bolts or threaded screws can also be used.

Each of the flexible sheet members 45 are attached at a mediate point to a drawback/reinforcing member 47. Flexible members 45 are drawn back like a bow string. As flexible members 45 are drawn back, rigid members 41 also tend to draw away from the interior of the pipe.

As shown in FIG. 3, each of drawback/reinforcing members 47 has a pivotally mounted link 49 attached to the back and to a point near the periphery of a driven wheel 50. Guide members 51 and 53 are attached to the back of each drawback/reinforcing member to hold the member in alignment with rigid members 41. As driven wheel 50 rotates in a first direction, each flexible sheet member 45 is pulled backward, away from the inner wall of concrete pipe 21. As the flexible members are drawn back, substantially rigid members 41 are also pulled back slightly from the walls of the pipe, relieving the pressure against the wall and enabling the testing apparatus to move freely from one joint to the next. When the testing apparatus arrives at the next joint and is positioned relative to the pipe joint to be tested, driven wheel 50 is rotated in the opposite direction which causes flexible members 45 to move outwardly against the inner wall of the concrete pipe where they are reinforced by members 47. As flexible members 45 on either side of rigid member 41 move outwardly, rigid member 41 also moves outwardly reestablishing the overall configuration of the flexible seal. The annular void, now defined by the seal, can now be evacuated or pressurized to determine the integrity of the pipe joint.

Figure 5:
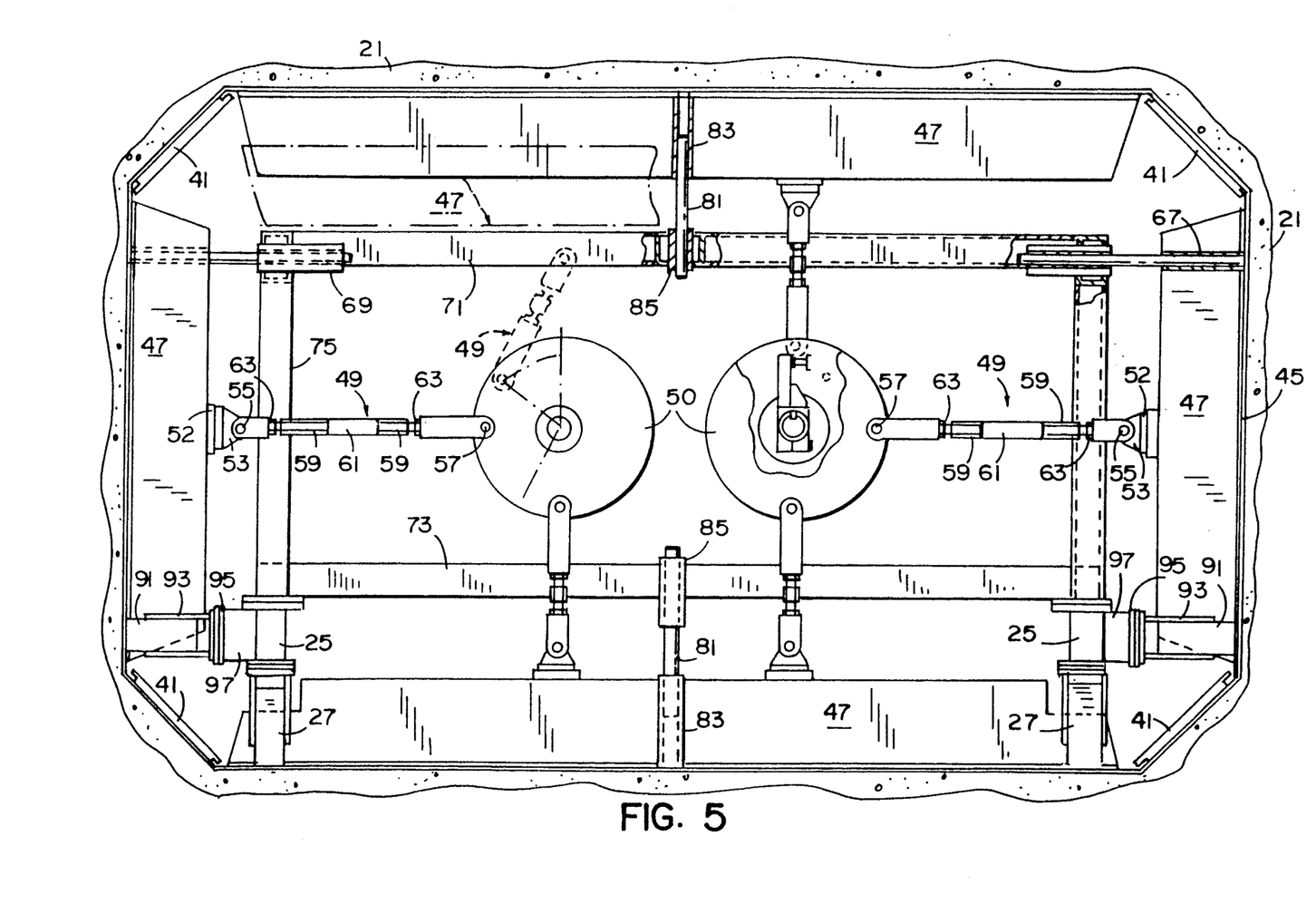
FIG. 5 is an elevational view of the drive apparatus used to contract and expand the sealing apparatus on the mobile pipe joint tester.

The driving mechanism for the flexible seal can be seen in greater detail in FIG. 5. The flexible seal has four substantially rigid members 41 which, as shown in FIG. 5, abut the haunch on the interior of the precast concrete box pipe. Flexible steel sheet members 45 are shown being pressed against the interior surface of concrete pipe 21 by drawback/reinforcing members 47. Links 49 are pivotally attached to the back of each drawback/reinforcing member. On the back of each drawback/reinforcing member is a pivot support 52 which has an apertured flange 53 through which a pivot pin 55 passes. The first end of each each link 49 is pivotally attached to pivot pin 55. The second end of link 49 is pivotally attached to a driven wheel 50 by means of a pivot pins 57 which are fixed near the periphery of driven wheel 50. The length of each link 49 can be adjusted by turning a threaded shaft 59 in each end of the sleeve 61. A threaded nut 63 can then be used to set the position of the several pieces establishing the length of each link 49.

A guide rod 65 is fastened to drawback/reinforcing member 47 in a suitable socket 67. The other end of rod 65 is free to move in a bushing 69 supported by frame 70.

Frame 70 is of a substantially rectangular box-like construction having an upper member 71 spaced from a bottom member 73 by vertical members 75 and 77. For strength, the several members making up the frame are preferably of tubular steel construction. The steel can be either circular or rectangular steel tubing.

The upper and lower drawback/reinforcing members 47 also have guide rods 81 to maintain the positioning of the member relative to frame 70. One end of guide rod 81 is fastened in a sleeve 83 in drawback/reinforcing member 47 while the opposite end is free to move in a bushing 85 supported on frame members 71 and 73.

As shown in phantom in the upper left of FIG. 5, when driven wheel 50 rotates counterclockwise, links 49 cause drawback/reinforcing members 47 to be pulled inwardly away from the interior of concrete pipe 21. Flexible steel sheet members 45 are not shown in the phantom portion of FIG. 5 but would bend, as shown in FIG. 4, pulling back since each flexible member is preferably held at only one point on the surface of drawback/reinforcing member 47. When all of the flexible steel members 45 are drawn back, the testing apparatus can freely move through the pipe from joint to joint. It is important to note that the seal made up of rigid members 41 and flexible members 45 forms a substantially continuous band or ring which is not disassembled in moving from joint to joint, but is merely flexed inwardly and then restored to its outward position for testing.

Referring now to the lower left and right corners of FIG. 5, frame 70 is supported on spaced wheels 27 and is guided along the inner walls of the concrete pipe by wheels 91, similar to wheels 27. Each wheel 91 is rotatably supported in a yoke 93 which is attached to a mounting face 95 on a stub projection 97 of frame 25. Wheels 27 and 91 enable the testing apparatus to move freely and to be guided along the inner walls of the precast concrete pipe.

While FIG. 5 illustrates a portion of an embodiment of the test apparatus used with rectangular concrete pipe, similar concepts would be used for the supporting frame for round concrete pipe. For example, similar wheels can be used for supporting and guiding the test apparatus through a round concrete pipe.

Figure 6:
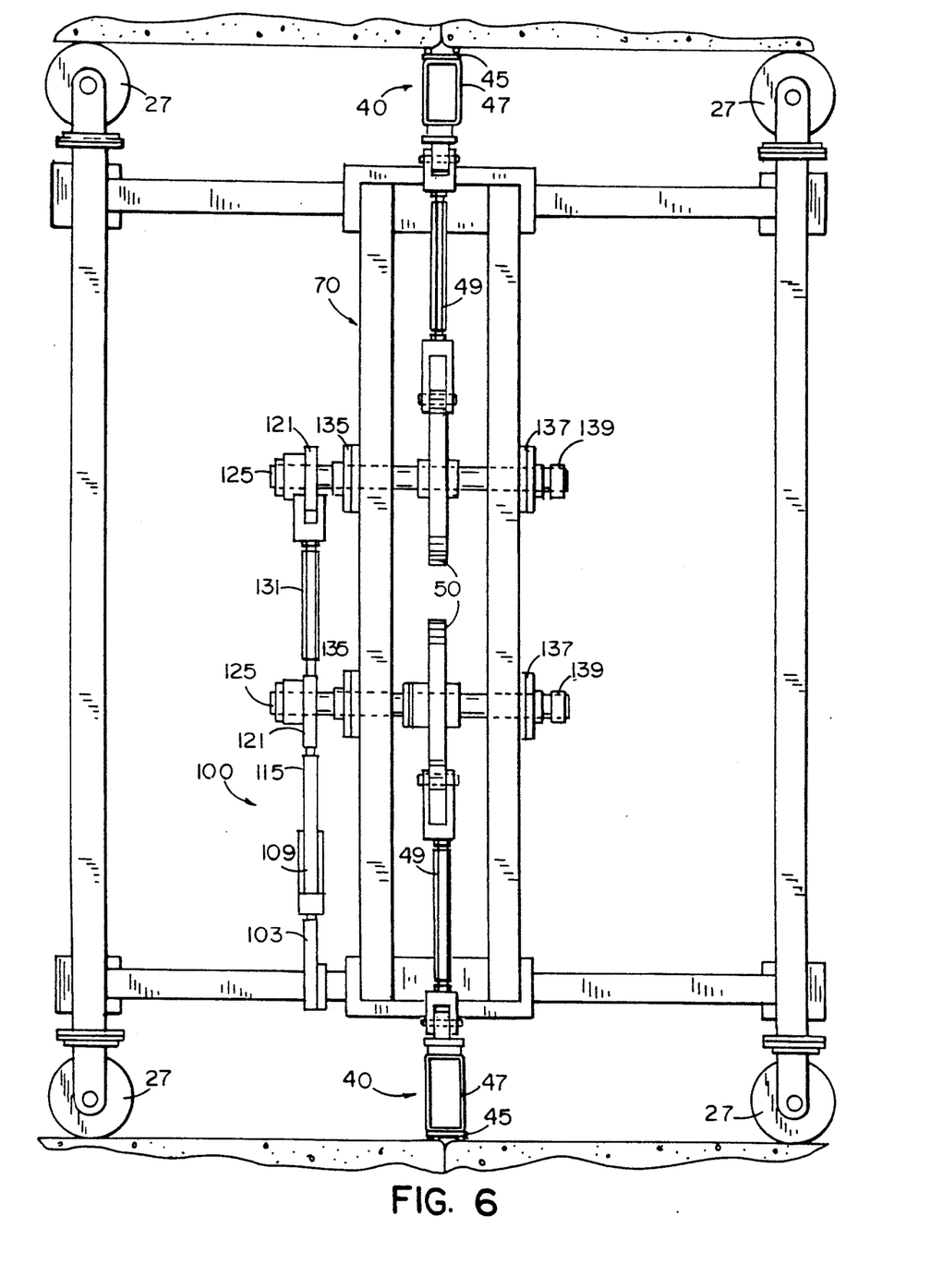
FIG. 6 is a a top plan view of the mobile pipe joint testing apparatus.
Figure 7:
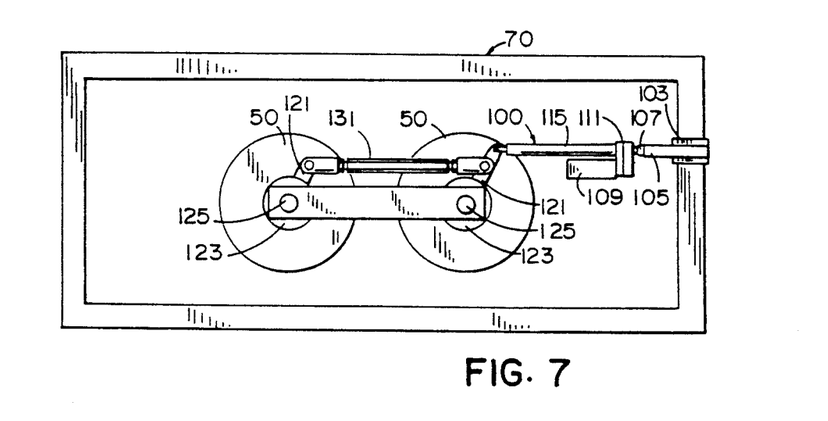
FIG. 7 is an elevational view of the driving means used to expand and contract the sealing apparatus.

Now turning to FIGS. 6 and 7, each of driven wheels 50 is caused to rotate by a driver 100 which is preferably an electric ball screw actuator. The actuator is fastened to frame 70 by a collar 103 at one end of connecting shaft 105. Driver 100 is attached to a pivot pin 107 on the end of shaft 105 which enables driver 100 to flex. An electric motor 109 is attached to a drive 111 for the ball screw actuator which causes a shaft 113 supported in tube 115 to extend or retract. Shaft 113 is pivotally attached to a pivot pin 119 on driving crank 121 which is attached to axle 125. Each driven wheel 50 rotates along with supporting axle 125.

An adjustable link 131, similar to links 49, is connected between each driving crank 121 so that driven wheels 50 will rotate the same amount, in the same direction, at the same time, to move seal member 40 between a concrete pipe wall contacting position and a retracted disengaged position. More specifically, When shaft 113 extends from actuator 100, driven wheels 50 are caused to rotate approximately 66°. This is sufficient to flex the continuous steel sealing member enabling the testing apparatus to be moved through a concrete pipe. On the return stroke, shaft 113 causes flexible members 45 to return to the wall contacting position where they are firmly held in place by drawback/reinforcing members 47. Shafts 125 are journaled in bearing blocks 135 and 137 on each side of frame 70. A locking collar 139 is provided near the distal end of each axle 125.

In order to provide a continuous sealing surface (FIG. 8), a flexible plate 141 is attached to the face of flexible member 45. A layer of an organic polymeric material, preferably a urethane material 143, is attached to the face of plate 141. A pair of spaced, circumferential channels 145 are cut into the face of the urethane material for supporting rubber gaskets 147. Gaskets 147 are substantially U-shaped and are inserted into the channels 145 and then locked in place by a resilient cord 149 which spreads the legs of the U-shaped gasket. Seals 147 are substantially identical to the seal 151, which is inserted in the face of concrete section 22, to form a watertight seal. A complete description of seals of this type can be found in related patent application Ser. No. 07/842,086.

Figure 8:
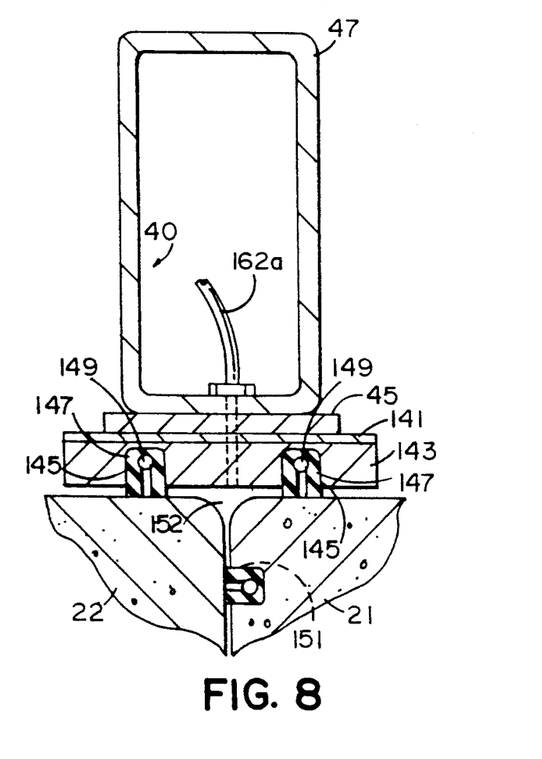
FIG. 8 is a schematic sectional view of the sealing apparatus in place to test a pipe joint.

When sealing member 40 is in place against the pipe joint to be tested, an annular space 152 is defined between seal 40 and the pipe joint under test. In the preferred method of operation of the testing apparatus (FIG. 2), a vacuum source 155 is connected to a tank 157 of predetermined volume. A valve 159 is provided for sealing the tank and a connecting pipe 161 (shown cut off to simplify the drawing) is connected to vacuum pump 155 by line 161A and to annual space 152 by line 162A, lines 161, 161A and 162A being operatively interconnected such as by a tee connector. An electric generator, illustrated schematically at 163, can be provided on carriage 25 or power can be brought to the testing apparatus by suitable flexible insulated lines. A pressure gauge 165 is provided on vacuum source 155 along with a clock 167 for timing the test.

When the testing apparatus is in place and the joint has been confined, vacuum source 155 is started to lower the pressure within confined annular space 152 and the predetermined known volume, tank 157, until the pressure reaches approximately 10 psi within the known test volume. The vacuum source is then stopped and the pressure in the void volume is monitored on gauge 165 for a period of time monitored on clock 167 to determine the integrity of the joint under test. The length of time of the particular test is determined by the size of the pipe joint being tested and can run from a few seconds up to a few minutes. If the pipe joint holds the vacuum, or if the vacuum decreases due to air leaking through the joint at a rate within the tolerance of the test, the joint is considered to be acceptable. On the other hand, if the joint cannot hold a vacuum due to excessive air leaking through the joint, the pipe sections can be dismantled since the pipe assembling equipment is in the immediate vicinity. The sealing gasket and the seal can be examined to see if any debris such as a stone or root may have disrupted the seal, causing an air leak. Once the joint has been carefully inspected and if, for example, the gasket is found to be damaged, the gasket can be removed from the face of the concrete pipe and replaced with a new fresh gasket and the pipes can be reassembled and tested again.

Figure 9:
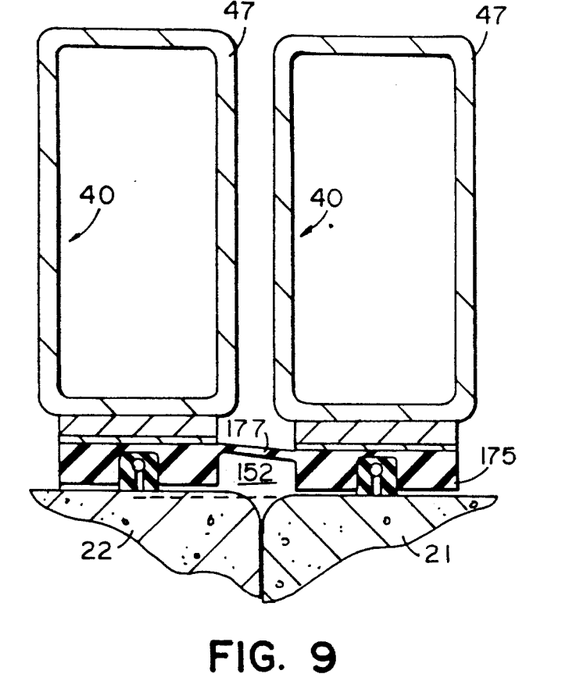
FIG. 9 is a schematic sectional view of a modified testing apparatus having two sealing means used to test a joint between offset pipe sections.

If the sections of concrete pipe 21 and 22 making up a pipe line are not closely aligned (FIG. 9), it is within the scope of the present invention to provide a double flexible seal 40 for testing a non-aligned pipe joint. In view of the non-alignment of the concrete pipes, an elongated flexible sealing pad 175 is provided having a bridge or flexible web 177 joining the sealing pads together into an integral assembly. Confined annular space 152 to be tested would be slightly larger, in this case, in view of the offset of the concrete pipes and the increased area bounded by the flexible pads and bridge 177. The joint, however, would be tested in the same manner as previously described.

Figure 10:
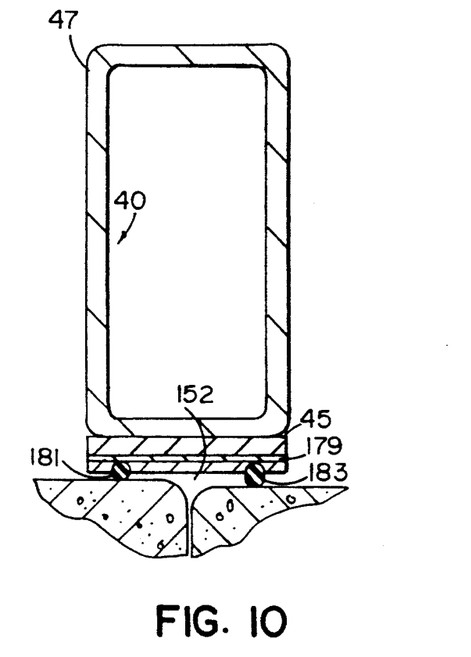
FIG. 10 is a schematic view of another embodiment of the apparatus used to test offset pipe joints.

If the pipe joint is not too severely out of alignment, which should be the normal occurrence in view of the alignment hardware being used, a simpler testing device can be used, as shown in FIG. 10. Here again, flexible pad 179 is provided on the face of flexible member 45 and a pair of O-ring members 181 and 183 can be supported in the flexible member. As shown in FIG. 10, the O-ring members do not have to be the same size; it is only important that they properly seal annular space 152 during the joint test.

Figure 11:
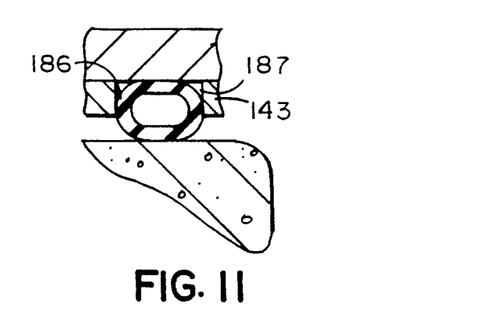
FIG. 11 is a schematic view of a portion of a seal used with the pipe joint testing apparatus.
Figure 12:
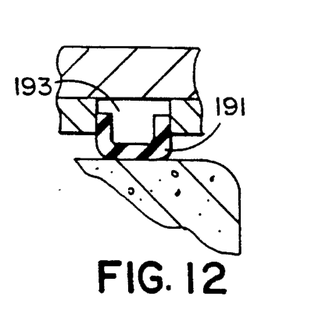
FIG. 12 is a schematic view of a second embodiment of a seal used with the pipe joint testing apparatus.

As shown in FIGS. 11 and 12, other suitable devices can be used for confining area 152. An inflatable tube 186 can be contained within a suitable channel 187 in polymeric face of material 143 or an annular cup-shaped member 191, which operates similar to a piston, can be confined in a space 193 which would be pressurized to force sealing member 191 into contact with the surface of the concrete pipe under test.

From the above description, it can be seen that a mobile pipe joint testing apparatus is provided which can be used on a test-as-you-go procedure. Using the apparatus shortly after each pipe joint is assembled, and while the pipe lifting and aligning equipment is still in the vicinity, the integrity of a pipe joint can be tested. If, for some reason, the joint fails the test, the equipment is at hand to dismantle the joint and to investigate and cure the cause of the failure. The pipe joint can then be reassembled and retested. The entire pipe line can be assembled with a feeling of confidence that each joint has individually passed the necessary tests.

While the preferred embodiment of the present invention would use a vacuum source to reduce the pressure within confined annular space 152 to carry out the integrity test, it is within the scope of the present invention to use a positive air pressure source, such as a small air compressor, to pressurize the confined space 152 for the integrity test. In that case, source 155 (see FIG. 1) would be a small air compressor.

It is also within the scope of the present invention to use water to fill the annular test space 152. The water can be carried on the mobile tester 20 or an external source of water, such as a hose can be used to supply the water. A water pump can be used in lieu of vacuum pump 155 and a water pressure gauge can be used for gauge 165. The change in pressure of the water sealed in annular test space 152 can be used to evaluate the integrity of the pipe joint being tested.

As mentioned in the background of the present application, the American Society for Testing Materials has several standard tests used for determining the integrity of precast concrete sewer pipes. The testing apparatus of the present invention would be correlated with these standard ASTM tests so that the engineers responsible for the assembly and testing of the concrete pipe line would know that each joint tested would also have successfully passed a corresponding ASTM standard test.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows.

1. An apparatus for testing the integrity of a joint between two sections of concrete pipe comprising:
   a frame;
   a flexible sealing means on said frame for providing a substantially airtight seal over a joint between two sections of concrete pipe, said joint including a gasket between said pipe sections and a portion of the surface of each concrete pipe section adjacent said gasket;
   said flexible sealing means including a plurality of substantially rigid members for establishing the outer configuration of said flexible sealing means;
   a plurality of flexible members connected at each end to said substantially rigid members to form, along with said rigid members, a substantially continuous surface in the configuration of the interior of a pipe joint being tested;
   a drive mechanism on said frame for moving said flexible sealing means between a concrete pipe contacting position and a retracted disengaged position;
   a pressure establishing means operatively connected to said flexible sealing means for establishing a controlled air pressure between said flexible sealing means and said pipe joint;
   a known volume means operatively connected to said pressure establishing means for establishing a substantially known test volume for each pipe joint being tested; and
   measuring means for monitoring the pressure in the known test volume over a period of time to determine the integrity of the pipe joint.

2. An apparatus for testing a pipe joint as set forth in claim 1, wherein said drive mechanism includes an over-center drive.

3. An apparatus for testing a pipe joint as set forth in claim 2, wherein said drive mechanism includes:
   at least one driven wheel; and
   a plurality of link members, each of said link members having a first and a second end with the first end of said link members being operatively connected to a mediate point on a flexible member and said second end being attached to said at least one driven wheel.

4. An apparatus for testing a pipe joint as set forth in claim 1, wherein said pressure establishing means is a vacuum source.

5. An apparatus for testing a pipe joint as set forth in claim 1, wherein said pressure establishing means is a positive air pressure source.

6. An apparatus for testing a pipe joint as set forth in claim 1, wherein in said pressure establishing means is a source of pressurized water.

7. An apparatus for testing a pipe joint as set forth in claim 1, wherein said known volume means is a tank.

8. An apparatus for testing a pipe joint as set forth in claim 1, wherein said frame includes a plurality of wheels for enabling said testing apparatus to freely move from joint to joint to test each pipe joint in a continuous length of pipe.

9. A mobile pipe joint testing apparatus for testing a joint between two sections of concrete pipe which is sealed by a resilient gasket comprising:
   a movable frame means for supporting said pipe joint testing apparatus;
   a sealing means, supported on said frame means, for sealingly bridging the interior portion of a pipe joint to be tested;

said sealing means including a plurality of substantially rigid members for establishing the outer configuration of said sealing means;

a plurality of elongated flexible members connected at each end to said substantially rigid members to form, along with said rigid members, a substantially continuous surface in the configuration of the interior of a pipe joint being tested;

air pressure establishing means operatively connected to said sealing means for establishing a controlled air pressure between said sealing means and a pipe joint being tested; and measuring means for monitoring the air pressure between said sealing means and a pipe joint being tested to determine the integrity of the pipe joint.

10. A mobile pipe joint testing apparatus as set forth in claim 9, including a known volume means operatively connected to said air pressure establishing means for establishing a substantially constant test volume for each pipe joint being tested.

11. A mobile pipe joint testing apparatus as set forth in claim 9, wherein said movable frame means includes a plurality of wheels for enabling said pipe joint testing apparatus to move along the interior of a pipe.

12. A mobile pipe joint testing apparatus as set forth in claim 9, wherein said apparatus includes a drive means on said frame means for moving said sealing means between a concrete pipe contacting position and a retracted disengaged position.

13. A mobile pipe joint testing apparatus as set forth in claim 9, including a drive mechanism comprising:
at least one driven wheel;
a plurality of link members each having a first and a second end, said first end of each of said link members being connected to said sealing means and the second end being connected to said at least one driven wheel; and
means for actuating said driven wheel to cause said link members to move said sealing means between a concrete pipe engaging position and a retracted disengaged position.

14. A method for testing the integrity of a joint between two sections of concrete pipe comprising the following steps:
providing a seal for sealingly bridging an interior portion of a joint between two pipe sections, said seal including first portions and second portions interconnecting said first portions such that said first and second portions define a continuous loop;
displacing said seal outwardly to engage said concrete pipe sections about said pipe joint to thus define a substantially closed annular space with the concrete pipe sections about the pipe joint to be tested;
actuating pressure establishing means for establishing a controlled pressure in said closed annular space;
monitoring the pressure in said space to determine the integrity of the pipe joint; and
displacing said seal inwardly to disengage said concrete pipe sections, said inwardly displacing causing said first portions of said seal to bend inwardly concavely to a position relative to said second portions such that said second portions are drawn inwardly by said first portions and thus both portions are disengaged from said concrete pipe sections.

15. A method for testing the integrity of a pipe joint as set forth in claim 14, wherein the pressure establishing means reduces the air pressure in said space below atmospheric pressure.

16. A method for testing the integrity of a pipe joint as set forth in claim 14, wherein the pressure establishing means increases the air pressure in said space above atmospheric pressure.

17. A method for testing the integrity of a pipe joint as set forth in claim 14, wherein each joint between two sections of concrete pipe is tested shortly after a joint is made.

18. A method for testing the integrity of a pipe joint as set forth in claim 14, wherein said seal includes two separate sealing members, one for engaging each of said two sections of concrete pipe, for defining an airtight space when the two sections of concrete pipe are not aligned.

19. An apparatus for testing the integrity of a joint between two sections of concrete pipe, said concrete pipes each including a non-circularly shaped cross section having generally planar wall sections that define corners at locations where the planar wall sections meet, comprising:
a frame;
a flexible sealing means on said frame for providing a substantially airtight seal over a joint between two sections of concrete pipe, said joint including a gasket located between said pipe sections and a portion of the surface of each concrete pipe section adjacent said gasket, said sealing means including corner engaging portions for sealingly engaging said wall sections at said corners, and further including wall engaging portions for sealingly engaging said generally planar wall sections, said wall engaging portions being movable outwardly to a concrete pipe contacting position so that said corner engaging portion and said wall engaging portions sealingly engage said concrete pipe sections about said joint, and being movable inwardly to a bowed disengaged condition so that said wall engaging portions and said corner engaging portions disengage from said concrete pipe sections;
a drive mechanism on said frame for moving said flexible sealing means between the concrete pipe contacting position and the disengaged position;
a pressure establishing means operatively connected to said flexible sealing means for establishing a controlled air pressure between said flexible sealing means and said pipe joint;
a known volume means operatively connected to said pressure establishing means for establishing a substantially known test volume for each pipe joint being tested; and
measuring means for monitoring the pressure in the known test volume over a period of time to determine the integrity of pipe joint.

20. A mobile pipe joint testing apparatus for testing a joint between two sections of concrete pipe which is sealed by a resilient gasket, said concrete pipes each including a non-circularly shaped cross section having generally planar wall sections that define corners at locations where the planar wall sections meet, comprising:
a movable frame means for supporting said pipe joint testing apparatus;
a sealing means, supported on said frame means, for sealingly bridging the interior portion of a pipe joint to be tested, said sealing means including corner engaging portions for sealingly engaging said wall sections at said corners, and further including wall engaging portions for sealingly engaging said generally planar wall sections, said wall engaging portions being movable outwardly to a concrete pipe contacting position so that said corner engaging portion and said wall engaging portions sealingly engage said concrete pipe sections about said joint, and being movable inwardly to a bowed disengaged condition so that said wall engaging portions and said corner engaging portions disengage from said concrete pipe sections;

air pressure establishing means operatively connected to said sealing means for establishing a controlled air pressure between said sealing means and a pipe joint being tested; and measuring means for monitoring the air pressure between said sealing means and a pipe joint being tested to determine the integrity of the pipe joint.

* * * * *